June 30, 1953     P. T. RUSSELL     2,644,123
ACOUSTICAL APPARATUS
Filed Feb. 1, 1939
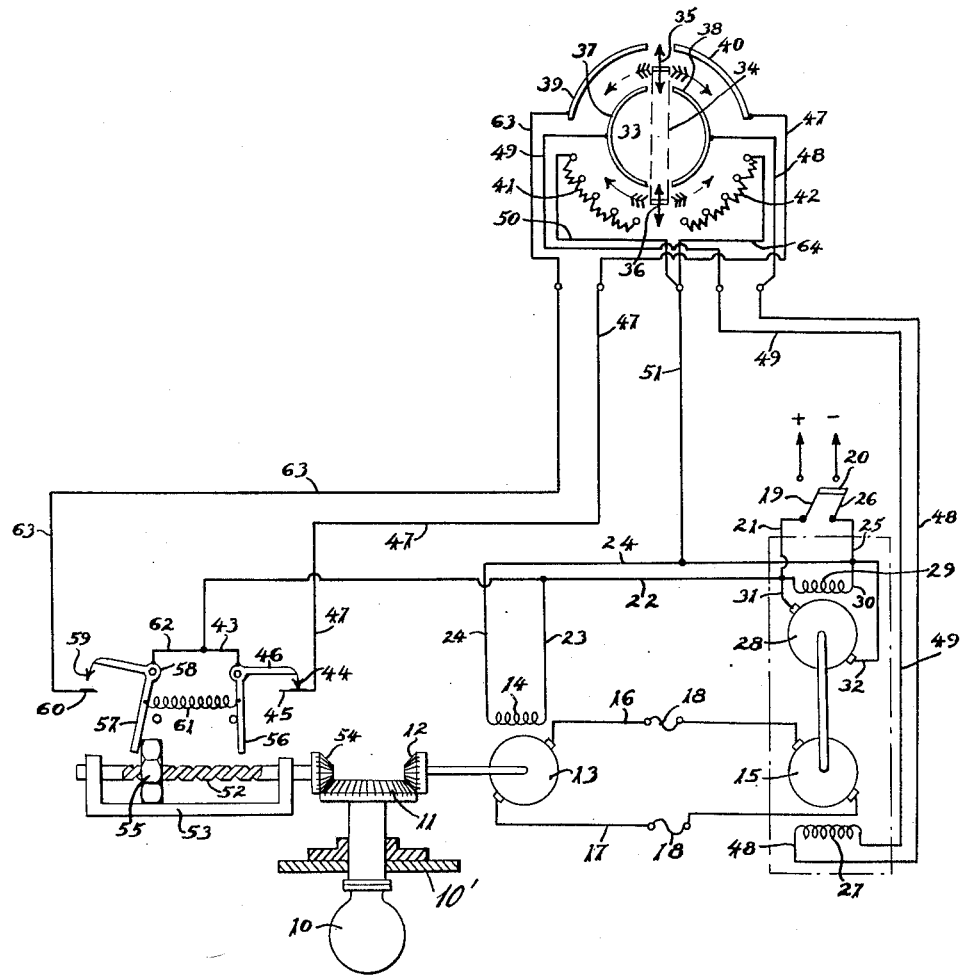
INVENTOR
PHILIP T. RUSSELL
BY
*Ransom K. Davis*
ATTORNEY

Patented June 30, 1953 2,644,123

UNITED STATES PATENT OFFICE 2,644,123

ACOUSTICAL APPARATUS

Philip T. Russell, Mount Rainier, Md.

Application February 1, 1939, Serial No. 253,980

1 Claim. (Cl. 318—158)

(Granted under Title 35, U. S. Code (1952), sec. 266)

This invention relates to acoustical apparatus and it has a particular relation to apparatus adapted to be projected through the hull of a ship for transmitting and receiving sound energy subaqueously.

The principal object of the present invention is the provision of an apparatus of the character described which may quickly and easily be rotated about a vertical axis in order to train the projecting and receiving instrumentality in the direction in which the sound waves may be propagated or received with the maximum intensity and to immediately arrest its movement when such point is reached.

Another object of the invention is the provision of a novel mechanism for automatically stopping the rotation of the device when it moves through an angle of arc of predetermined magnitude so as to prevent the electrical conductors which connect the projector and/or receiver with the portion of the apparatus located within the ship from becoming twisted or broken.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claim.

In order to make the invention more clearly understood, there is shown in the accompanying drawing, means for carrying the invention into practical use, without limiting the improvements in their useful application to the particular construction, which, for the purpose of explanation, have been made the subject of illustration.

The single figure of the accompanying drawing is a diagrammatic view of an acoustical apparatus constructed in accordance with the present invention.

Referring to the drawing, a device of any suitable type for transmitting and/or receiving sound energy is indicated at 10. This device is adapted to be projected through the hull 10' of a vessel and may be rotated in order to train the apparatus in the desired direction by means of a bevel gear 11 fixed to the inboard end thereof. The gear 11 is driven by a bevel pinion 12 meshing therewith which is, in turn, driven by a direct current variable speed electric motor 13 having a field winding 14. The armature of the motor 13 is energized by direct current supplied by a generator 15 through wires 16 and 17 provided with fuses 18 and the field winding 14 of said motor is energized by current supplied from the positive terminal of a source of direct current, through one blade 19 of a double pole switch 20, wires 21, 22 and 23, field winding 14 and wires 24 and 25 and blade 26 of switch 20 to the negative terminal of said source. The generator 15 is provided with a field winding 27 which is energized at certain times by current flowing in one direction and at other times by current flowing in an opposite direction in a manner and for a purpose presently to be described, and is driven by any suitable prime mover such as an electric motor 28 provided with a field winding 29. The winding 29 is energized by electric current which traverses a circuit from the positive terminal of the source through blade 19, wire 21, field winding 29, wires 30 and 25 and blade 26 of switch 20 to the negative terminal of source. The armature winding of the motor 28 is energized by electric current which traverses a circuit from positive terminal of source through blade 19 of switch 20, wires 21 and 31, armature winding of motor 28, wires 32 and 25 and blade 26 of switch 20 to the negative terminal of source.

The apparatus also includes a training control rheostat, indicated generally at 33, by means of which the direction and speed of rotation of the projector 10 may be controlled. This rheostat comprises a rotatable arm 34 provided with bridging contacts 35 and 36 at opposite ends, a pair of spaced inner segmental contacts 37 and 38, a pair of spaced outer segmental contacts 39 and 40 and a pair of segmental resistance elements 41 and 42. When the arm 34 is rotated in a clockwise direction the contact 35 bridges the segmental contacts 38 and 40 and the contact 36 bridges the segmental contact 37 and the resistance element 41. On the other hand, when the arm 34 is rotated in a counter-clockwise direction, the contact 35 bridges the segmental contacts 37 and 39 and the contact 36 bridges the segmental contact 38 and the resistance element 42.

If, now that it is desired to rotate the projector and receiver 10 in a clockwise direction, the switch 20 is closed and the arm 34 of the training control rheostat 33 rotated clockwise as above described. This will establish a circuit in one direction from the positive terminal of the source of current, through blade 19 of switch 20, wires 21, 22 and 43, contacts 44 and 45 of a first limit switch 46, the purpose of which will later be described, wire 47, contact segment 40 of training control rheostat 33, contact 35, contact segment 38, wire 48, field winding 27 of generator 15, wire 49, contact segment 37, contact 36 and resistance element 41 of training control rheostat 33, wires 50, 51, 24 and 25, and blade 26 of switch 20 to the negative terminal of the source.

The current flowing through the field winding 27 in the direction described causes current to be generated which will cause the motor 13 to rotate in a certain direction. Assuming that under these conditions, the motor rotates in a clockwise direction, the projector 10 will be rotated in a corresponding direction and at a speed determined by the amount of the resistance 41 included in the circuit. This rotary movement of the projector 10 is arrested when it has turned through a predetermined angle of arc so as to prevent the conductors therein from becoming twisted or broken, by a device including a screw 52 which is rotatably mounted in a bracket 53 and driven by a bevel pinion 54 which meshes with the bevel gear 11. Threaded onto the screw 52 is a nut 55 one of its flat faces engaging the bracket 53 so as to prevent it from turning. When the various elements are rotating in the direction assumed, the nut 55 will travel to the right, as viewed in the drawing, until it engages an arm 56 of the limit switch 46 opening the contacts 44—45 and interrupting the circuit just traced through the field winding 27 of the generator 15. This will interrupt the supply of current to the field winding 27 of the generator 15 which will cause the deenergizing of the armature winding of the motor 13 so that any further rotation thereof under its own momentum will cause it to function as a generator itself and feed back current to the generator 15. This action of the motor 13 will meet with considerable opposition such as will quickly bring it to rest by this dynamic braking effect. This immediately stops rotation of the members 10 and prevents twisting or breaking of the conductors leading to the projector 10.

When the nut 55 travels to the right, as above described, it moves out of engagement with an arm 57 of a second limit switch 58 in a reversing circuit now to be described, permitting contacts 59 and 60 thereof to be closed by a spring 61. It will be understood that when the nut 55 is in any position except the two extremes of its travel, both of the limit switches 46 and 58 will be closed but the circuits therethrough will be controlled manually by the training control rheostat.

If it is desired to rotate the projector and receiver 10 in the reverse direction, the arm 34 will be turned in a counter-clockwise direction so as to interrupt the circuit just traced through the field winding 27 of the generator 15 and establishing another circuit therethrough in an opposite direction. Current in this circuit passes from the positive terminal of its source, through blade 19 of switch 20, wires 21, 22 and 62, contacts 59 and 60 of limit switch 58 which are now closed, wire 63, contact segment 39, contact 35, and contact segment 37 of the training control rheostat 33, wire 49, field winding 27 of generator 15, wire 48, segmental contact 38, contact 36, and resistance element 42 of the training control rheostat 33, wires 64, 51, 24 and 25 and blade 26 of switch 20 to the negative terminal of the source. The energizing of the field winding 27 by current flowing in the direction just described causes the generator 15 to excite the motor 13 in an opposite direction so as to rotate the pinion 12, gear 11 and projector 10 in an opposite direction. The operation of the limit switch 58 when the projector is thus turned is the same as that previously described in connection with the limit switch 46. It will of course be understood that the projector 10 may be stopped at any intermediate position by rotating the arm 34 of the training control rheostat to the neutral position shown in the drawings in which the circuit through the field winding 27 of the generator 15 will be opened independently of the limit switches 46 and 58 and dynamically brake the rotation of the parts in the manner heretofore described.

It will be understood that the above description and accompanying drawing comprehend only the general and preferred embodiment of the invention, and that various other changes in the construction, proportion and arrangement of the parts may be made by those skilled in the art without departing from the nature and scope of the invention as defined in the appended claims.

The invention described herein may be manufactured and/or used by or for the Government of the United States of America for governmental purposes without the payment of any royalties thereon or therefor.

I claim:

An acoustical apparatus comprising a rotatable member extending through the hull of a vessel for transmitting and receiving sound energy subaqueously, electrical conductors connected directly to said member to eliminate transient sounds, training gearing for rotating said member including a bevel gear, a direct current reversible motor, means connecting said motor to said training gearing for driving said training gearing and rotatable member, a generator including a field winding, said generator having connections for supplying reversible electric power to said motor, means for driving said generator, a pair of circuits each including said field winding, a training control switch for controlling the speed of said motor, said training control switch having a central deenergized position and being movable to one side thereof for connecting said circuits to a pair of poles of a source of direct current and to said field winding, and movable to the other side thereof to connect said poles in reverse to said field winding, limit means comprising a reciprocable travelling member and a bevel pinion for moving said travelling member, said bevel pinion engaging said bevel gear, a biased limit switch at opposite sides of said travelling member, each limit switch having a normal position and operable from said normal position by said travelling member when said travelling member is at a limit position, each of said limit switches returning to normal position when said travelling member leaves said limit position, said limit switches being in said circuits, said circuits being connected so that said training switch solely controls said field winding in all positions of said travelling member, except its limit positions, to move said motor in either direction by selected amounts at any time, said circuits being connected whereby whenever said field winding is deenergized electric power will then flow from said motor to said generator to effect dynamic braking in said motor to immediately arrest the rotation of said motor and said member at the desired point and to prevent said electrical conductors leading to said member from becoming twisted and broken.

PHILIP T. RUSSELL.

References Cited in the file of this patent

UNITED STATES PATENTS

| Number | Name | Date |
|---|---|---|
| 696,017 | Dutton | Mar. 25, 1902 |
| 888,447 | Leonard | May 19, 1908 |
| 905,508 | Fleischmann et al. | Dec. 1, 1908 |
| 945,103 | Lord | Jan. 4, 1910 |
| 1,002,567 | Davison | Sept. 5, 1911 |
| 1,126,095 | Schiessler | Jan. 26, 1915 |
| 1,204,826 | Schiessler | Nov. 14, 1916 |
| 1,657,239 | Clymer | Jan. 24, 1928 |
| 1,684,138 | Nixdorff | Sept. 11, 1928 |
| 1,860,499 | Furnas et al. | May 31, 1932 |
| 1,986,647 | Schmutte | Jan. 1, 1935 |
| 2,060,997 | Lockett | Nov. 17, 1936 |
| 2,081,032 | Bird | May 18, 1937 |
| 2,259,306 | Harding | Oct. 14, 1941 |